April 27, 1954 E. F. ALLBERT ET AL 2,677,082
MOTOR CONTROL SYSTEM
Filed Dec. 17, 1949
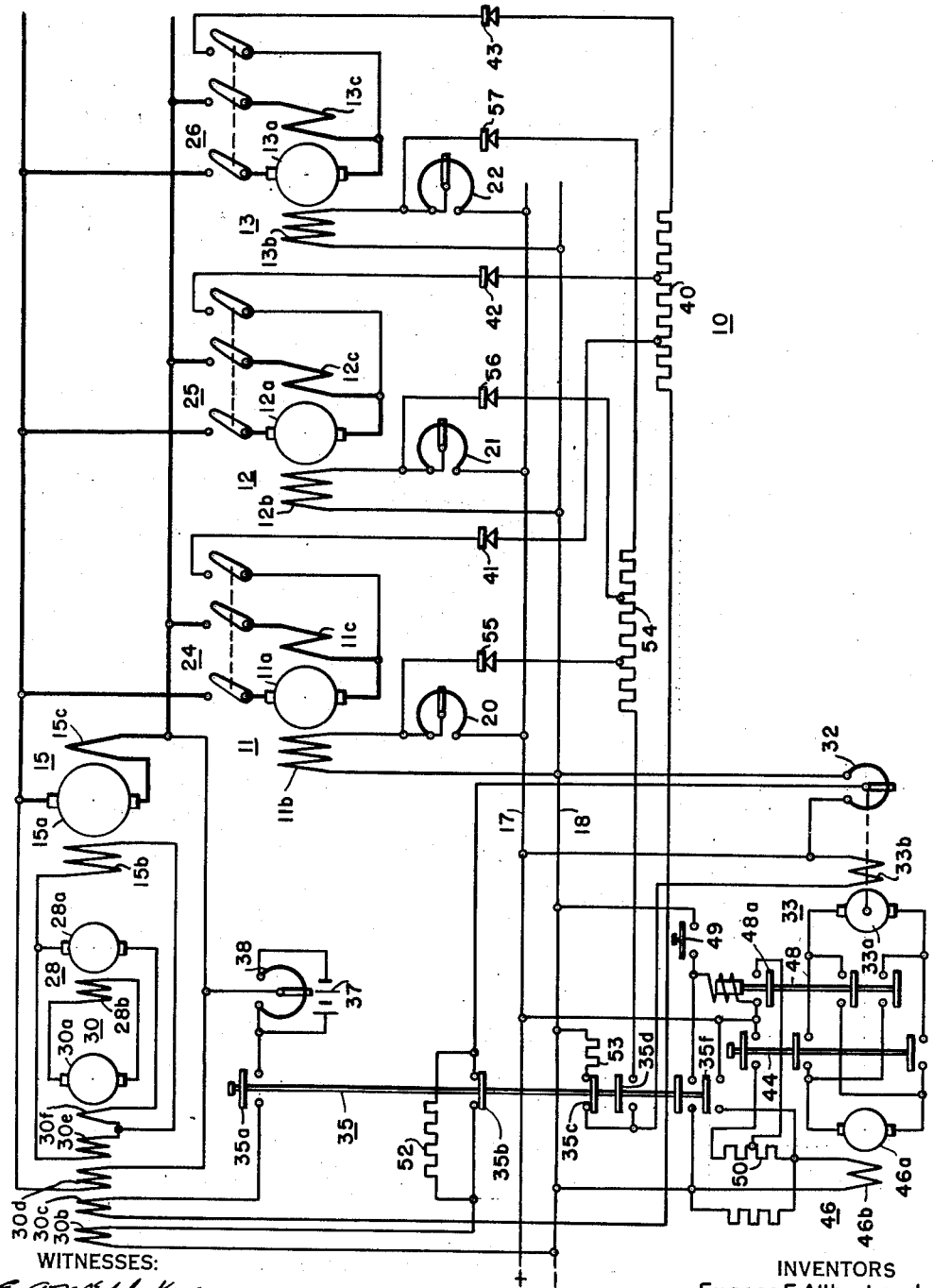
WITNESSES:
E. A. McCloskey
F. V. Giolma
INVENTORS
Eugene F. Allbert and
William T. Hunt, Jr.
BY
G. M. Crawford
ATTORNEY Patented Apr. 27, 1954

2,677,082

UNITED STATES PATENT OFFICE 2,677,082

MOTOR CONTROL SYSTEM

Eugene F. Allbert, Buffalo, and William T. Hunt, Jr., Williamsville, N. Y., assignors to Westinghouse Electric Corporation, East Pittsburgh, Pa., a corporation of Pennsylvania Application December 17, 1949, Serial No. 133,599

12 Claims. (Cl. 318—63)

1

Our invention relates, generally, to motor control systems, and it has refrence in particular to control systems for controlling the operation of a plurality of motors which may be connected in driving relation with the several elements of a work device, such as a tandem rolling mill.

Generally stated, it is an object of our invention to provide a motor control system which is simple and inexpensive to manufacture and is reliable and effective in operation.

More specifically, it is an object of our invention to provide, in a control system for a plurality of motors, for quickly and safely decelerating the motors under emergency conditions.

Another object of our invention is to provide, in a control system for a plurality of motors, for decelerating them at a rate selectively determined in accordance with the field strength of the motor having the weakest field, and the armature current of the motor having the greatest value of armature current.

Yet another object of our invention is to provide, in a control system for a plurality of motors, for quickly reducing the voltage applied to the motor armatures to effect regeneration and then utilizing a voltage regulating generator as a current regulator to determine the rate of deceleration of the motors.

It is also an object of our invention to provide, in a control system for a motor, for stopping the motor by reducing the armature voltage at a rate which is proportional to the strength of the motor field.

It is an important object of our invention to provide, in a control system for a plurality of motors, for controlling the field excitation of a rheostat motor which determines the armature voltage applied to the motors inversely in accordance with the field strength of the motor having the weakest field.

A further object of our invention is to provide, in a control system for a plurality of motors, for abruptly reducing the armature voltages of the motors to effect regeneration, effecting a further reduction of the armature voltages at a rate proportional to the field strength of the motor having the weakest field, and regulating the rate of reduction of the armature voltages so as to limit the regenerative armature current to a safe value.

Other objects will, in part, be obvious and will in part, be described hereinafter.

In practicing our invention in accordance with one of its forms, a regulating generator is utilized to normally regulate the voltage applied by a main generator to the armatures of a plurality of work motors, such as the roll stand motors of a tandem mill. This regulating generator is provided with a pattern field winding normally connected to a source of electrical energy through a motor-operated master rheostat which is utilized to vary the generator voltage. A resistor connected in series circuit relation with the master rheostat is normally shunted and the shunt is removed when an emergency stop is made, so as to reduce the generator voltage relatively abruptly in order to produce regeneration. A current winding is provided on the regulating generator, and when making an emergency stop, it is connected in series circuit relation in a source of bias voltage and rectifier means, in parallel with the commutating field windings of the several motors so as to be energized only when a predetermined value of regenerative current is attained by any one of the motors, so as to limit the value of the regenerative current. The speed of the master rheostat motor in reducing the pattern field excitation is regulated in accordance with the field strength of the motor having the weakest field by connecting the rheostat motor field across the field rheostats of the several motors in a parallel circuit arrangement with blocking rectifier devices so that the rheostat motor operates at a speed which is proportional to the field strength of the motor having the weakest field.

For a more complete understanding of the nature and scope of our invention, reference may be made to the following detailed description, which may be read in connection with the accompanying drawing in which the single figure is a diagrammatic view of a motor control system embodying the invention in one of its forms.

Referring to the drawing, the reference numeral 10 may denote generally a motor control system wherein a plurality of motors 11, 12 and 13, which may be connected in driving relation with the several stands of a tandem mill (not shown), may be connected for energization from a source of electrical energy, such as a main generator 15, having an armature 15a, a main field winding 15b, and a series or commutating field winding 15c.

The motors may comprise armatures 11a, 12a and 13a, main field windings 11b, 12b and 13b, and series or commutating field windings 11c, 12c and 13c, respectively. The field windings 11b, 12b and 13b may be connected to a suitable source of control voltage represented by the conductors 17 and 18, through field rheostats 20, 21 and 22, respectively. The armatures of the motors may be connected to the armature 15a of the main generator by means of switch devices 24, 25 and 26, respectively.

The field winding 15b of the main generator 15 may be supplied with electrical energy from an exciter 28 having an armature 28a and a field winding 28b. The excitation of the field winding 15b, and hence the voltage applied to the armatures of the motors 11, 12 and 13 may be controlled by utilizing a regulating generator 30 for controlling the excitation of the exciter field winding 28b. The regulating generator 30 may comprise an armature 30a, a pattern field winding 30b, a current field winding 30c, a differential field winding 30d, an antihunt field winding 30e, and a self-energizing type field winding 30f.

The pattern field winding 30b may be connected to the control conductors 17 and 18 through a master rheostat 32 provided with an operating motor 33. The differential field winding 30d may be connected in opposed relation to the pattern field winding 30b being, for example, connected across the armature 15a of the main generator 15, so as to provide for normally regulating the output voltage of the generator. The anti-hunt field winding 30e may be connected across the armature 28a of the exciter 28 in series circuit relation with the self-energizing field winding 30f.

The current field winding 30c is not normally connected, and is disposed to be connected for energization in accordance with the armature current of the motor having the greatest value of armature current, under emergency stopping conditions. For example, the field winding 30c may be connected by means of an emergency stop switch device 35 in a parallel circuit relation with the commutating field windings of the several motors and in series circuit relation with an opposing source of bias voltage represented by the battery 37 and potentiometer 38. This series arrangement may, as shown, be connected in shunt relation with the several commutating field windings by means of a tapped resistor 40 and rectifier devices 41, 42 and 43, which act as blocking devices and prevent the circulation of current between the several commutating field windings.

Operation of the rheostat motor 33 may be normally effected by means of an accelerating push-button switch 44 which connectes the armature 33a of the rheostat motor across the armature 46a of a rheostat generator 46 in such a direction as to effect operation of the rheostat 32 to increase the energization of the pattern field winding 30b of the regulating generator 30, and hence raise the output voltage of the generator 15.

The rheostat motor 33 may be likewise provided with a decelerating relay 48 operated by a push-button switch 49 for connecting the armature 33a to the armature 46a of the rheostat generator for operating the master rheostat in the opposite direction so as to reduce the output voltage of the main generator 15.

With a view to effecting acceleration and deceleration of the motors at different rates, a control resistor 50 may be connected in series circuit relation with field winding 46b of the rheostat generator, and a contact member 48a may be provided on the decelerating relay 48 for shunting a portion of the resistor 50. A contact member 35f may be provided on the emergency stop switch 35 for shunting all of the resistor 50 so as to effect operation of the rheostat motor at a maximum rate during emergency stops. An additional contact member 35b may be provided on the emergency stop switch 35 for normally shunting a resistor 52 and for effectively connecting it in circuit relation with the pattern field winding 30b to reduce the voltage of the generator 15 when an emergency stop is made and provided for regeneration by the motors 11, 12 and 13.

In order to prevent too rapid deceleration of the mill when one of the stand motors may be operating under relatively weak field conditions, circuit means may be provided for effecting operation of the rheostat motor 33 in accordance with the field strength of the mill motor having the weakest field condition when an emergency stop is being made. For example, the field winding 33b of the rheostat motor 33 may be normally connected to the control conductors 17 and 18 through a control resistor 53, which provides a substantially fixed value of field excitation.

The emergency stop switch 35 may be utilized to transfer the connection of the field winding 33b from the control conductors 17 and 18, and to connect it in parallel circuit relation with the field rheostats 20, 21 and 22 of the several mill motors. This connection may be provided by means of a tapped control resistor 54, which may be calibrated in accordance with the relative speeds of the different mill stands, and rectifier devices 55, 56 and 57 which act as blocking devices to prevent the circulation of current between the field circuits of the several motors.

The mill may be started by closing the disconnect switches 24, 25 and 26 and actuating the accelerating push-button switch 44. The operation of the latter connects the field winding 46b of the rheostat generator to the control conductors, and also connects the armature 33a of the rheostat motor to the armature 46a of the rheostat generator in such a direction as to operate the master field rheostat 32 in a direction to increase the excitation of the pattern field winding 30b of the regulating generator 30. During normal operation the regulating generator 30 operates to maintain a predetermined value of output voltage on the main generator 15, which is determined by the balancing of the M. M. F. of the differential field winding 30d against the M. M. F. of the pattern field winding 30b.

To effect a normal deceleration of the mill, the decelerating push-button switch 49 may be actuated to provide an obvious operating circuit for the decelerating relay 48 which reverses the connections of the rheostat motor 33 and operates the master rheostat 32 in a direction to reduce the excitation of the pattern filed winding 30b and hence reduce the output voltage of the main generator 15. Since a portion of the control resistor 50 is shunted through contact members 48a of the decelerating relay 48, the energization of the field winding 46b of the rheostat generator will be increased, and hence the rheostat motor 33 will operate at a higher speed to decelerate the mill.

Should it be necessary to make an emergency stop, the emergency stop switch 35 may be actuated. The energization of the pattern field winding 30b will be immediately decreased, since contact members 35b are opened to insert the control resistor 52 in circuit relation with the pattern field winding 30b. This effects an immediate reduction in the output voltage of the main generator 15 and provides for effecting regeneration by the motors 11, 12 and 13. At the same time, the closure of contact members 35a connects the current field winding 30c in series circuit relation with the bias voltage from the source 37 and in shunt circuit relation with the commutating field windings 11c, 12c and 13c of the several motors so as to be energized in accordance with the armature current of the motor having the maximum value of armature current, when said value exceeds a predetermined safe value as determined by the bias voltage. The regulating generator 30 may thus be used as a current regulating generator to limit the value of armature current of the several motors.

When the emergency stop switch 35 is actuated, its contact members 35c are opened and its contact members 35d closed. The opening of contact members 35c disconnects the field winding 35b of the rheostat motor from the control conductors 17 and 18 and the closure of contact members 35d reconnects this field winding in shunt circuit relation with the field rheostats 20, 21 and 22 of the several motors so as to limit the speed of the rheostat motor 33 in accordance with the field strength of the motor having the weakest field condition.

From the above description and the accompanying drawing, it will be apparent that we have provided, in a simple and effective manner, for rapidly bringing the several motors of a machine, such as a tandem mill, to a quick stop under emergency conditions. By utilizing variable speed control of the operating motor of the master rheostat, the rate of deceleration may be at all times kept in accordance with the field condition of the motor having the weakest field condition, thus maintaining stable operation of the motors. By utilizing a control system wherein the generator voltage is abruptly reduced initially so as to produce regeneration, and the voltage regulating generator is reconnected to effect regulation of the motor armature currents so as to limit the maximum current of any one motor to a predetermined value, a reliable and effective control system is provided.

Since certain changes may be made in the above described construction and different embodiments of the invention may be made without departing from the spirit and scope thereof, it is intended that all the matter contained in the above description, as shown in the accompanying drawing, shall be considered as illustrative and not in a limiting sense.

We claim as our invention:

1. The combination with a plurality of motors having armatures and field windings, of generating means connected to supply electrical energy to the armatures of the motors including regulating means with a plurality of control windings, circuit means connecting one of said windings to make the regulating means normally responsive to the voltage applied to the armatures, and circuit means connecting another of said control windings to the armatures of the motors to regulate the voltage applied to the armatures in accordance with the armature current of the motor having the greatest value of armature current.

2. In a control system for a plurality of motors each having an armature and a field excitation circuit, circuit means connected to supply electrical energy to the armatures of the motors including a regulating generator having field excitation means normally connected to regulate the voltage at which the electrical energy is supplied, circuit means including a motor-operated rheostat connected to control the energization of the field excitation means of the regulating generator and hence the regulating level of the generating means, and additional circuit means including a plurality of parallel circuits each including a blocking rectifier device disposed to be connected one to each of the field excitation circuits of the motors to effect operation of the rheostat motor in accordance with energization of the field winding of the motor having the weakest field condition.

3. A control system for a plurality of motors each having a field winding connected to a source of electrical energy through individual field rheostats and an armature comprising, generating means disposed to supply electrical energy to the armatures, a regulating generator connected to supply field excitation to the generating means, said regulating generator having a plurality of field excitation means including a pattern field winding disposed to be energized from a source of control voltage and a differential control field winding energized in accordance with the voltage applied to the armatures, a motor-operated field rheostat connected in circuit relation with the pattern field winding operable to vary the output voltage of the regulating generator, said rheostat motor having a field winding, and circuit means connecting the field winding in parallel circuit relation with the field rheostats of the motor field windings.

4. A control system for a plurality of motors each having an armature and a field winding with separate field rheostats connected in circuit relation with each field winding comprising, regulating means connected to regulate the supply of electrical energy to the motor armatures, control means operable to vary the regulating level of the regulating means, and circuit means including a plurality of parallel circuits having blocking means therein connected to apply a control voltage to the control means inversely proportional to the field strength of the motor having the weakest field.

5. In a control system for a plurality of motors having field excitation circuits, control means operable to vary the supply of electrical energy to said motors, and circuit means including a rectifier device connected to apply to the control means a control voltage from the field excitation circuit of each of the motors for operating the control means at a rate inversely proportional to the speed of the motor having the weakest field.

6. The combination with a plurality of motors each having an armature and a field winding connected to a source of electrical energy through a field rheostat individual to the particular field winding, of generating means connected to supply electrical energy to the motor armatures, regulating means normally disposed to effect excitation of the generating means to regulate the output voltage of the generating means, control means operable to effect operation of the regulating means to vary the excitation of the generating means, and circuit means including a rectifier device individual to each motor connected to apply control voltages to the control means proportional to the voltages across the field rheostats of the motors.

7. In combination with a plurality of motors each having an armature and a field winding disposed to be connected to a source of control voltage through a separate field rheostat, main generating means connected to supply electrical energy to the motor armatures, a regulating generator having pattern and control field windings connected to normally regulate the voltage of the generating means, switch means operable to abruptly reduce the energization of the pattern field winding and connect the regulating generator to limit the armature current of the motors, and control means operable to reduce the energization of the pattern field winding at a rate in accordance with the energization of the field winding of the motor having the weakest field.

8. In a control system for a plurality of motors having armatures and field windings, generating means connected to normally regulate the voltage applied to the motor armatures, control means operable to abruptly reduce said voltage to effect regeneration, and circuit means disposed to be connected to vary the voltage in accordance with the regenerated current.

9. In a control system for a plurality of motors connected in driving relation with work devices handling a strip of material, generating means connected to normally regulate the voltage at which electrical energy is applied to the motors, switch means operable to abruptly reduce said voltage, and circuit means including a blocking rectifier device associated with each motor to apply to the generating means a current limiting control voltage proportional to the armature current of the motor having the greatest value of armature current.

10. In a control system for a plurality of motors, generating means connected to supply electrical energy to the motors, a regulating generator connected to normally regulate the output voltage of the generating means to maintain a predetermined value of armature voltage, control means including a motor-operated rheostat operable to vary the regulating level of the regulating generator, and circuit means connected to effect operation of the motor-operated rheostat at different predetermined rates of speed including a generator for supplying electrical energy to the rheostat motor and relay means operable to vary the field excitation of the generator.

11. A control system for a motor comprising, generating means connected to supply electrical energy to the motor, a regulating generator connected to normally regulate the output voltage of the regulating means to maintain a predetermined value of armature voltage, control means including a motor-operated rheostat connected to vary the value of armature voltage for which the regulating generator regulates, auxiliary generating means connected to supply electrical energy to the rheostat motor, and circuit means connected to effect operation of the auxiliary generating means to supply electrical energy to the rheostat motor at a plurality of different voltages.

12. A control system for a plurality of motors each having an armature and a field winding with a field rheostat in circuit therewith comprising, main generating means connected to supply electrical energy to the armatures of said motors, a regulating generator connected to regulate the output voltage of the generating means, said regulating generator having a pattern field winding and a plurality of differential control field windings, circuit means connecting the pattern field winding to a source of control voltage including a motor-operated field rheostat, said rheostat motor having a field winding, a current limiting field resistor connected in circuit relation with the pattern field winding, switch means operable to shunt said field resistor, additional circuit means including a calibrating resistor and a rectifier for each motor connected between successive points on the resistor and points intermediate the motor field windings and their rheostats, transfer means normally connecting the rheostat motor field winding to a source of control voltage operable to connect it across the several field rheostats through the calibrating resistor and rectifier devices, a control circuit including contact means of the transfer means disposed to connect one of the differential control field windings to be energized in accordance with the armature current of the motor having the maximum value of armature current, and control means operable to effect operation of the switch means and transfer means.

References Cited in the file of this patent

UNITED STATES PATENTS

| Number | Name | Date |
| --- | --- | --- |
| 2,238,639 | Gulliksen | Apr. 15, 1941 |
| 2,342,767 | Stoltz | Feb. 29, 1944 |
| 2,467,784 | Snyder | Apr. 19, 1949 |